No. 737,878. PATENTED SEPT. 1, 1903.
E. T. SPECHT.
CUFF HOLDER.
APPLICATION FILED NOV. 21, 1902.
NO MODEL.
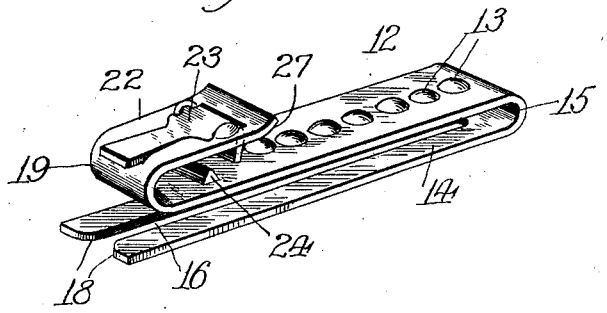
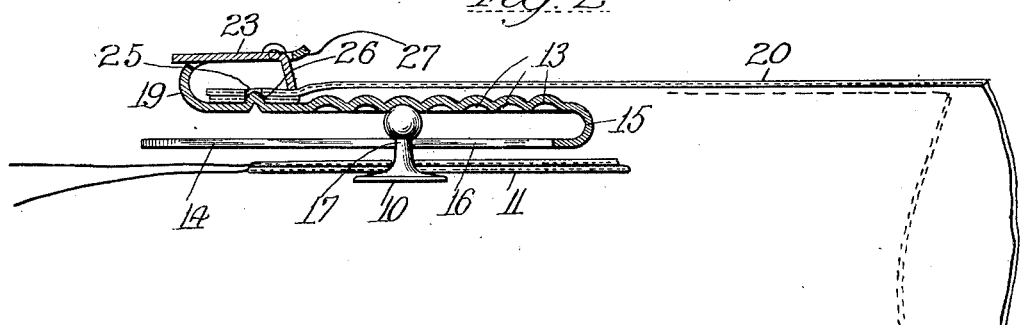
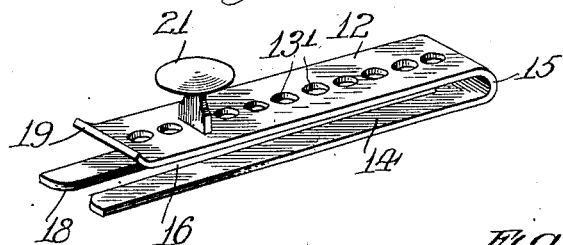
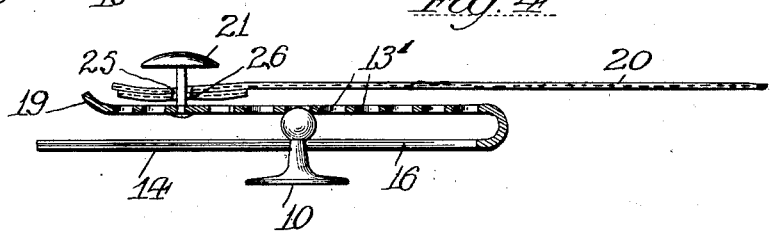
Witnesses
Harold G. Barrett
T. Molitor
Inventor:
Eugene T. Specht,
By Coburn, McRoberts McElroy
Attys.

No. 737,878. Patented September 1, 1903.

UNITED STATES PATENT OFFICE.

EUGENE T. SPECHT, OF CHICAGO, ILLINOIS, ASSIGNOR OF ONE-HALF TO WILLIAM MUELHOEFER, OF CHICAGO, ILLINOIS.

CUFF-HOLDER.

SPECIFICATION forming part of Letters Patent No. 737,878, dated September 1, 1903.

Application filed November 21, 1902. Serial No. 132,266. (No model.)

*To all whom it may concern:*

Be it known that I, EUGENE T. SPECHT, a citizen of the United States, residing at Chicago, in the county of Cook and State of Illinois, have invented certain new and useful Improvements in Cuff-Holders, of which the following is a specification.

My invention is concerned with certain new and useful improvements in that class of devices which are designed to secure a detachable shirt-cuff to the wristband thereof, and is designed to produce a device of the class described by the use of which the cuff can be quickly and easily secured in any desired position of adjustment relative to the wristband.

Referring to the accompanying sheet of drawings, in which the same reference characters are used to designate identical parts in all the figures, Figure 1 is a perspective view of the preferred form of my invention. Fig. 2 is a longitudinal section through the center of the same with the cuff and wristband buttoned in position, showing how the parts are arranged in use; and Figs. 3 and 4 are similar views of a modified form of the invention.

I have shown my invention as designed for use especially with the ordinary round-headed collar or cuff button 10, which is secured in the wristband 11 of a shirt in the ordinary manner. The essential feature of the adjusting and securing mechanism is the elongated U-shaped metallic piece composed of the upper half piece 12, having a series of concave indentations 13 on the under side thereof and arranged in a straight line as closely together as possible. The lower part 14, which is integral with the upper part and connected thereto by the U-shaped bend 15, has extending directly beneath the indentations 13 the elongated slot 16, which is of a width to just accommodate the shank 17 of the button 10, with which it is used. The distance between the two parts 12 and 14 is such that the head of the button, when slid in between the two parts, is held firmly in whatever position of adjustment the holder may be left, the top of the head coöperating with an indentation 13 and the lower portion thereof with the slot 16. For convenience in placing the holder in position I preferably round off the edges of the slot 16, as seen at 18, and turn up the adjacent end of the upper portion 12 in a slight curve, as seen at 19.

To hold the cuff 20 in position on the holder, I may secure to the upper side thereof the head and shank of the customary collar-button 21, as seen in Figs. 3 and 4; but I preferably employ the novel holding or clamp mechanism shown in Figs. 1 and 2, where it will be seen that the corresponding end of the upper portion 12 is bent over a U shape, forming the short extension 22 a short distance above and parallel to the portion 12. Pivotally mounted in this extension 22 is a clamping-lever 23, which is of the customary construction and is designed to engage with the end of the cuff 20 in the manner clearly shown in Fig. 2. As an additional aid to hold the cuff in position I preferably provide the transverse lug 24, projecting upwardly from the end of the part 12, which may be struck up from the body thereof and which is adapted to enter the customary button-holes 25 and 26, formed in the ends of a cuff, and to assist the clamp 23 in holding the cuff in position. The outer end of the extension 22 is turned upward slightly, as seen at 27, to facilitate the placing of the cuff in the clamp. It will be observed that the two parts are not connected at the wristband end, thus obviating the necessity of employing the enlargement for an opening for the admission of the collar-button head, which has been necessary in similar devices where the two parts were connected at both ends. It will also be noted that the cuff-holding means are at this free end, so that the holder in position is practically all within the cuff and where it will not interfere with or catch on the sleeve-lining.

While I have shown my invention as embodied in the form which I at present consider best adapted to carry out its purposes, it will be understood that it is capable of some slight modifications and that I do not desire to be limited in the interpretation of the following claims except as may be necessitated by the state of the prior art—for instance, instead of having the indentations 13 struck into the body of the plate 12 I might cut recesses 13' entirely through the plate, as shown in Figs. 3 and 4.

Having thus described my invention, what I claim as new, and desire to secure by Letters Patent of the United States, is—

1. As a new and useful article of manufacture, a cuff-holder consisting of the two parts adapted to coöperate with the head and shank of a button and connected at one end but free at the other, the upper part being provided with a cuff-holding means on the upper surface at the free end, the lower part being provided with the elongated slot therein, and one of said parts being provided with recesses for retaining the holder in any desired position of adjustment.

2. A cuff-holder consisting of the U-shaped piece of spring metal adapted to coöperate with the head and shank of a button, the upper part being provided with cuff-holding means on its upper surface at the free end, the lower part being provided with the slot therein, and one of said parts being provided with recesses to retain the holder in any desired position of adjustment relative to the button.

3. A cuff-holder consisting of the two parts adapted to coöperate with the head and shank of a button and connected at one end but free at the other, the upper part being provided with the recesses in the under surface thereof and with the cuff-holding means on the upper surface at the free end, and the opposed lower part being provided with the slot 16 therein beneath the recesses.

4. A cuff-holder consisting of the U-shaped piece of spring metal adapted to coöperate with the head and shank of a button, the upper arm being provided with the recesses in the under surface thereof and with the cuff-holding means on the upper surface at the free end, and the opposed lower part being provided with the slot 16 therein beneath the recesses.

5. As a new and useful article of manufacture, a cuff-holder consisting of the two parts adapted to coöperate with the head and shank of a button and connected at one end but free at the other, the upper part being provided with a cuff-holding means on the upper surface at the free end, the lower part being provided with the elongated slot therein, and one of said parts being provided with recesses for retaining the holder in any desired position of adjustment, said cuff-holding means consisting of the U-shaped extension having the clamping-lever mounted in the upper portion thereof.

6. As a new and useful article of manufacture, a cuff-holder consisting of the two parts adapted to coöperate with the head and shank of a button, the upper part being provided with a cuff-holding means on the upper surface, the lower part being provided with the elongated slot therein, and one of said parts being provided with recesses for retaining the holder in any desired position of adjustment, said cuff-holding means consisting of the U-shaped extension having the clamping-lever mounted in the upper portion thereof and the opposing projection adapted to fit in the buttonholes of the cuff.

7. A cuff-holder consisting of the two parts adapted to coöperate with the head and shank of a button, the upper part being provided with the recesses in the under surface thereof and with the cuff-holding means on the upper surface, and the opposed lower part being provided with the slot 16 therein beneath the recesses, said cuff-holding means consisting of the U-shaped extension having the clamping-lever mounted in the upper portion thereof and the opposing projection adapted to fit in the buttonholes of the cuff.

In testimony whereof I affix my signature in presence of two witnesses.

EUGENE T. SPECHT.

Witnesses:
W. MUELHOEFER,
JOHN H. MCELROY.